US008639816B2

(12) United States Patent
Turner et al.

(10) Patent No.: US 8,639,816 B2
(45) Date of Patent: *Jan. 28, 2014

(54) DISTRIBUTED COMPUTING BASED ON MULTIPLE NODES WITH DETERMINED CAPACITY SELECTIVELY JOINING RESOURCE GROUPS HAVING RESOURCE REQUIREMENTS

(75) Inventors: Bryan C. Turner, Apex, NC (US); John Toebes, Cary, NC (US); Douglas Jay Walker, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/541,621

(22) Filed: Jul. 3, 2012

(65) Prior Publication Data

US 2012/0271944 A1 Oct. 25, 2012

Related U.S. Application Data

(63) Continuation of application No. 13/221,625, filed on Aug. 30, 2011, now Pat. No. 8,239,540, which is a continuation of application No. 11/053,954, filed on Feb. 10, 2005, now Pat. No. 8,051,170.

(51) Int. Cl.
*G06F 15/16* (2006.01)
*G06F 15/173* (2006.01)
*H04L 12/28* (2006.01)
*H04L 12/50* (2006.01)

(52) U.S. Cl.
USPC ........... 709/226; 709/201; 709/203; 709/227; 709/228; 370/255; 370/256; 370/370; 370/390

(58) Field of Classification Search
None
See application file for complete search history.

(56) References Cited

U.S. PATENT DOCUMENTS

| 5,049,873 | A | * | 9/1991 | Robins et al. ............... 370/254 |
| 5,428,793 | A | | 6/1995 | Odnert et al. |
| 5,555,417 | A | | 9/1996 | Odnert et al. |
| 5,951,694 | A | | 9/1999 | Choquier et al. |
| 6,014,669 | A | * | 1/2000 | Slaughter et al. ............ 707/610 |
| 6,195,682 | B1 | * | 2/2001 | Ho et al. ...................... 709/203 |

(Continued)

OTHER PUBLICATIONS

Cates, "Robust and Efficient Data Management for a Distributed Hash Table", Master's Thesis, Massachusetts Institute of Technology, May 2003, pp. 1-64.

(Continued)

*Primary Examiner* — Ario Etienne
*Assistant Examiner* — Ho Shiu
(74) *Attorney, Agent, or Firm* — Leon R. Turkevich

(57) ABSTRACT

A network provides distributed computing services based on participation in respective resource groups by computing nodes, each resource group including a corresponding resource requirement for any computing node that joins the corresponding resource group for execution of the corresponding distributed computing service. Each computing node, in response to determining its corresponding available node capacity, is configured for selectively creating and joining at least one new resource group for execution of a corresponding distributed computing service having a corresponding resource requirement, and/or selectively joining at least one of the available resource groups, based on the corresponding available node capacity satisfying the corresponding resource requirement. Each computing node also is configured for selectively leaving any one of the joined resource groups based on determined conditions. Hence, each computing node may choose to participate in as many resource groups as needed for respective computing services, based on the corresponding available node capacity.

20 Claims, 6 Drawing Sheets

(56) References Cited

U.S. PATENT DOCUMENTS

| | | | |
|---|---|---|---|
| 6,311,251 B1* | 10/2001 | Merritt et al. | 711/114 |
| 6,392,705 B1* | 5/2002 | Chaddha | 348/388.1 |
| 6,418,477 B1* | 7/2002 | Verma | 709/240 |
| 6,421,687 B1 | 7/2002 | Klostermann | |
| 6,466,936 B1* | 10/2002 | Ronstrom | 1/1 |
| 6,516,350 B1* | 2/2003 | Lumelsky et al. | 709/226 |
| 6,556,544 B1* | 4/2003 | Lee | 370/256 |
| 6,697,064 B1 | 2/2004 | Kilgard et al. | |
| 6,865,527 B2* | 3/2005 | Go et al. | 703/22 |
| 6,970,913 B1* | 11/2005 | Albert et al. | 709/217 |
| 6,975,613 B1* | 12/2005 | Johansson | 370/338 |
| 6,985,976 B1* | 1/2006 | Zandonadi et al. | 710/56 |
| 7,003,575 B2* | 2/2006 | Ikonen | 709/228 |
| 7,017,016 B2* | 3/2006 | Chujo et al. | 711/147 |
| 7,047,177 B1* | 5/2006 | Lee et al. | 703/22 |
| 7,076,783 B1* | 7/2006 | Frank et al. | 719/313 |
| 7,089,192 B2* | 8/2006 | Bracchitta et al. | 705/7.22 |
| 7,095,739 B2* | 8/2006 | Mamillapalli et al. | 370/390 |
| 7,111,147 B1* | 9/2006 | Strange et al. | 711/209 |
| 7,117,257 B2* | 10/2006 | Beshai | 709/221 |
| 7,136,903 B1* | 11/2006 | Phillips et al. | 709/217 |
| 7,162,476 B1* | 1/2007 | Belair et al. | 1/1 |
| 7,203,871 B2 | 4/2007 | Turner et al. | |
| 7,216,090 B2* | 5/2007 | LaCroix | 705/14.73 |
| 7,272,645 B2* | 9/2007 | Chang et al. | 709/223 |
| 7,272,652 B1* | 9/2007 | Keller-Tuberg | 709/227 |
| 7,299,410 B2 | 11/2007 | Kays et al. | |
| 7,421,502 B2* | 9/2008 | Czap et al. | 709/229 |
| 7,457,835 B2 | 11/2008 | Toebes et al. | |
| 7,478,149 B2* | 1/2009 | Joshi et al. | 709/223 |
| 7,499,998 B2 | 3/2009 | Toebes et al. | |
| 7,529,822 B2* | 5/2009 | Joshi et al. | 709/223 |
| 7,543,020 B2 | 6/2009 | Walker et al. | |
| 7,574,523 B2* | 8/2009 | Traversat et al. | 709/238 |
| 8,051,170 B2 | 11/2011 | Turner et al. | |
| 8,239,540 B2 | 8/2012 | Turner et al. | |
| 2002/0010692 A1 | 1/2002 | Sasagawa et al. | 706/21 |
| 2002/0010783 A1* | 1/2002 | Primak et al. | 709/228 |
| 2002/0077791 A1* | 6/2002 | Go et al. | 703/2 |
| 2002/0103893 A1* | 8/2002 | Frelechoux et al. | 709/223 |
| 2002/0114341 A1* | 8/2002 | Sutherland et al. | 370/428 |
| 2002/0161835 A1* | 10/2002 | Ball et al. | 709/203 |
| 2002/0169861 A1* | 11/2002 | Chang et al. | 709/223 |
| 2002/0188657 A1* | 12/2002 | Traversat et al. | 709/201 |
| 2003/0026268 A1* | 2/2003 | Navas | 370/400 |
| 2003/0035380 A1* | 2/2003 | Downing et al. | 370/255 |
| 2003/0051117 A1* | 3/2003 | Burch et al. | 711/173 |
| 2003/0069974 A1* | 4/2003 | Lu et al. | 709/226 |
| 2003/0074256 A1* | 4/2003 | LaCroix | 705/14 |
| 2003/0074453 A1* | 4/2003 | Ikonen | 709/228 |
| 2003/0084157 A1* | 5/2003 | Graupner et al. | 709/226 |
| 2003/0149847 A1* | 8/2003 | Shyam et al. | 711/154 |
| 2003/0154238 A1* | 8/2003 | Murphy et al. | 709/201 |
| 2003/0185205 A1* | 10/2003 | Beshai | 370/354 |
| 2003/0204273 A1* | 10/2003 | Dinker et al. | 700/48 |
| 2004/0010588 A1* | 1/2004 | Slater et al. | 709/224 |
| 2004/0039891 A1* | 2/2004 | Leung et al. | 711/165 |
| 2004/0047354 A1* | 3/2004 | Slater et al. | 370/400 |
| 2004/0054656 A1* | 3/2004 | Leung et al. | 707/1 |
| 2004/0098447 A1* | 5/2004 | Verbeke et al. | 709/201 |
| 2004/0153708 A1* | 8/2004 | Joshi et al. | 714/4 |
| 2004/0186845 A1* | 9/2004 | Fukui | 707/100 |
| 2004/0194098 A1* | 9/2004 | Chung et al. | 718/100 |
| 2004/0204949 A1 | 10/2004 | Shaji et al. | |
| 2004/0208625 A1* | 10/2004 | Beshai et al. | 398/161 |
| 2004/0210767 A1* | 10/2004 | Sinclair et al. | 713/201 |
| 2004/0215650 A1 | 10/2004 | Shaji et al. | |
| 2004/0230596 A1* | 11/2004 | Veitch et al. | 707/101 |
| 2004/0257857 A1* | 12/2004 | Yamamoto et al. | 365/154 |
| 2005/0021349 A1* | 1/2005 | Cheliotis et al. | 705/1 |
| 2005/0027801 A1* | 2/2005 | Kashyap et al. | 709/204 |
| 2005/0036443 A1* | 2/2005 | Collins | 370/216 |
| 2005/0050545 A1* | 3/2005 | Moakley | 718/104 |
| 2005/0060406 A1* | 3/2005 | Zhang et al. | 709/225 |
| 2005/0114478 A1* | 5/2005 | Popescu et al. | 709/220 |
| 2005/0144173 A1* | 6/2005 | Yamamoto et al. | 707/10 |
| 2005/0257220 A1 | 11/2005 | McKee | |
| 2005/0283649 A1 | 12/2005 | Turner et al. | |
| 2006/0179037 A1 | 8/2006 | Turner et al. | |
| 2006/0179106 A1 | 8/2006 | Turner et al. | |
| 2006/0206621 A1* | 9/2006 | Toebes et al. | 709/238 |
| 2007/0086433 A1 | 4/2007 | Cunetto et al. | |
| 2007/0116234 A1 | 5/2007 | Schneider et al. | |
| 2009/0024868 A1* | 1/2009 | Joshi et al. | 714/4 |
| 2009/0276588 A1 | 11/2009 | Murase | |

OTHER PUBLICATIONS

Mockapetris, "Domain Names—Concepts and Facilities", Network Working Group, Request for Comments: 1034, Nov. 1987, pp. 1-55.
Mockapetris, "Domain Names—Implementation and Specification", Network Working Group, Request for Comments: 1035, Nov. 1987, pp. 1-55.
Gulbrandsen et al., "A DNS RR for specifying the location of services (DNS SRV)", Network Working Group, Request for Comments: 2782, Feb. 2000, pp. 1-12.
Calhoun et al., "Diameter Base Protocol", Network Working Group, Request for Comments: 3588, Sep. 2003, pp. 1-147.
Yokota et al., "A Proposal of DNS-Based Adaptive Load Balancing Method for Mirror Server Systems and Its Implementation", Proceedings of the 18th International Conference on Advanced Information Networking and Application (AINA '04), vol. 2, Mar. 29-31, 2004, pp. 1-6, Fukuoka, Japan.
"Dynamic Domain Name Service", [online], 2003, [retrieved on Nov. 2, 2004]. Retrieved from the Internet: <URL: http://www.dydns.com/services/services.htm, pp. 1-5.
Wikipedia, "Grid computing", [online], Jan. 25, 2005, [retrieved on Jan. 26, 2005]. Retrieved from the Internet: <URL: http://wikipedia.org/wiki/Grid_computing>, 3 pages.
Linksys, "Linksys and Tzolkin Corporation Team-Up to Bundle TZO Dynamic DNS Service with Linksys' Top-Selling Cable/DSL Routers", [online], Aug. 14, 2000 [retrieved on Nov. 2, 2004]. Retrieved from the Internet: <URL: http://www.linksys.com/press/press.asp-?prid=3>, pp. 1-2.
Karger et al., "Finding Nearest Neighbors in Growth-restricted Metrics", ACM Symposium on Theory of Computing (STOC '92), May 19-21, 2002, Montreal, Quebec, Canada, 10 pages.
Anderson et al., "Global namespace for files", IBM Systems Journal, vol. 48, No. 4, 2004, pp. 702-722.
Bourbonnais et al., "Towards an information infrastructure for the grid", IBM Systems Journal, vol. 43, No. 4, 2004, pp. 665-688.
Carpenter et al., "Abstract interdomain security assertions: A basis for extra-grid virtual organizations", IBM Systems Journal, vol. 43, No. 4, 2004, pp. 689-701.
Dabek et al., "Wide-area cooperative storage with CFS", SOPS '01, Oct. 21-24, 2001, Banff, Canada, 14 pages.
Burkard, "Herodotus: A Peer-to-Peer Web Archival System", Master's Thesis, Massachusetts Institute of Technology, May 2002, pp. 1-64.
Stoica et al., Chord: A Scalable Peer-to-peer Lookup Service for Internet Applications, SIGCOMM '01, Aug. 27-31, 2001, San Diego, California, ACM, pp. 1-12.
Dabek, "A Cooperative File System", Master's Thesis, Massachusetts Institute of Technology, Sep. 2001, pp. 1-55.
Cox et al., "Serving DNS using a Peer-to-Peer Lookup Service", In the proceedings of the First International Workshop on Peer-to-Peer Systems (IPTPS '02), Mar. 2002, Cambridge, MA, pp. 1-7.
Butte, "Solving the data warehouse dilemma with grid technology", IBM Global Services, Aug. 2004, 12 pages.
Horn et al., "A Logger System based on Web services", IBM Systems Journal, vol. 43, No. 4, 2004, pp. 723-733.
Dabek et al., "Building Peer-to-Peer Systems With Chord, a Distributed Lookup Service", Proceedings of the 8th Workshop on Hot Topics in Operating Systems (HotOS-VIII), May 2001, 6 pages.
Liben-Nowell et al, "Observations on the Dynamic Evolution of Peer-to-Peer Networks", In the proceedings of the First International Workshop on Peer-to-Peer Systems (IPTPS '02), Mar. 2002, Cambridge, MA, 6 pages.

(56) References Cited

OTHER PUBLICATIONS

Joseph et al., "Evolution of grid computing architecture and grid adoption models", IBM Systems Journal, vol. 43, No. 4, 2004, pp. 624-645.

Lewis et al., "MyMED: A database system for biomedical research on MEDLINE data", IBM Systems Journal, vol. 43, No. 4, 2004, pp. 756-767.

Meliksetian et al., "Design and implementation of an enterprise grid", IBM Systems Journal, vol. 43, No. 4, 2004, pp. 646-664.

Stoica et al., Chord: A Scalable Peer-to-peer Lookup Protocol for Internet Applications, ACM SIGCOMM 2001, San Diego, Aug. 2001, pp. 149-160.

Petersen et al., "A Blueprint for Introducing Disruptive Technology into the Internet", Proceedings of the First ACM Workshop on Hot Topics in Networks (HotNets-1), Princeton, NJ, Oct. 2002, 7 pages.

Liben-Nowell et al., "Analysis of the Evolution of Peer-to-Peer Systems", ACM Conf. On Principles of Distributed Computing (PODC), Monterey, CA, Jul. 2002, 10 pages.

"Preface", IBM Systems Journal, vol. 43, No. 4, 2004, pp. 622-623.

Sit et al., "Security Considerations for Peer-to-Peer Distributed Hash Tables", In the proceedings of the First International Workshop on Peer-to-Peer Systems (IPTPS '02), Mar. 2002, Cambridge, MA, pp. 1-6.

Tan et al., "Sevice domains", IBM Systems Journal, vol. 43, No. 4, 2004, pp. 734-755.

Wired Magazine, "The BitTorrent Effect", [online], 2005, [retrieved on Jan. 26, 2005]. Retrieved from the Internet: <URL: http://www.wired.com/wired/archive/13.01/bittorrent_pr/html>, 8 pages.

* cited by examiner

Resource Group Attributes, 22

Dist. Computing Service Attributes, 24

26 — Service Attributes (OS Type, Apps., DLLs, etc.)
28 — Data Attributes (Type, Author, Date, Time, Class, etc.)

Resource Requirements for Joining, 20

| Min. CPU Power (5M Inst./sec) | Min Data Storage (20GB) |
| Min. Bandwidth (100Mbps) | Min. Transaction Capacity (A) | ... |

Figure 2A

Resource Table, 30

| Computing Node (N1) Resources ||||||
|---|---|---|---|---|
| Reserved | Storage Space | Bandwidth | Transaction Cap. | CPU Pwr. |
| System | 10GB | 50Mbps | AA | 5MInst/s |
| S1 | 30GB | 100Mbps | A | 5MInst/s |
| S2 | 30GB | 150Mbps | B | 10MInst/s |
| Available | 100GB | 700Mbps | C | 30MInst/s |

Figure 2B

DISTRIBUTED COMPUTING BASED ON MULTIPLE NODES WITH DETERMINED CAPACITY SELECTIVELY JOINING RESOURCE GROUPS HAVING RESOURCE REQUIREMENTS

This application is a continuation of application Ser. No. 13/221,625, filed Aug. 30, 2011, which is a continuation of application Ser. No. 11/053,954, filed Feb. 10, 2005 and issued Nov. 1, 2011 as U.S. Pat. No. 8,051,170.

BACKGROUND OF THE INVENTION

1. Field of the Invention

The present invention relates to distributed computing in a network having multiple computing nodes. More particularly, the present invention relates to providing distributed computing services based on utilizing multiple computing nodes for sharing tasks associated with distributed computing services to provide a virtualization of distributed computing over a network of heterogeneous resources.

2. Description of the Related Art

Distributed computing has evolved to technologies that enable multiple devices to share in providing a given service. For example, grid computing has been proposed as a model for solving substantially large computational problems using large numbers of computers arranged as clusters embedded in a distributed infrastructure. Grid computing has been described as differentiated from distributed computing through an increased focus on resource sharing, coordination, manageability, and high performance. The focus on resource sharing has been referred to as "the grid problem", which has been defined as the set of problems associated with resource sharing among a set of individuals or groups.

A fundamental problem of distributed systems is the assumption that each peer computing node is substantially the same size. For example, a RAID (Redundant Array of Inexpensive Disks) storage device is implemented based on implementing a plurality of identical sized discs: a write operation to a disk at a prescribed disk block location can be easily repeated on the remaining disks of the RAID storage device by performing the same write operation to the same prescribed disk block location. Hence, existing systems do not contemplate the problem that a given peer computing node may run out of resources while attempting to perform its own tasks. In particular, if a distributed system is implemented using computing nodes (which may share resources such as computing power, storage capacity, bandwidth, etc.), where each computing node is responsible not only for storing its own data, but also for backing up data for other nodes, then a problem arises if a substantially larger node having a substantially larger amount of data (i.e., at least an order of magnitude larger) joins the network because the larger node will overwhelm the capacity of the smaller nodes of the distributed system. Consequently, a smaller node would be forced to either not back up the data of the larger node, resulting in a loss of data if the larger node is unavailable, or no longer store the data that it is responsible for, resulting in a loss of that data. Hence, the smaller nodes are incapable of storing their own data and backing up the data of the larger node.

In addition, attempts to partition a substantially larger computing node into multiple virtual computing nodes having a size that matches the existing computing nodes does not solve the problem of losing data, since a random distribution of the virtual computing nodes among the existing computing nodes still may result in one virtual computing node backing up the data of a second virtual computing node, wasting resources by replicating data on the same physical device, namely the larger computing node; further, a loss of the substantially larger computing node will result in a loss of all the multiple virtual computing nodes, hence the distributed network can encounter a loss of data based on relying on the virtual nodes backing up each other.

Consequently, newer, high-performance machines cannot be added to the network, since the newer machines must have the same capacity as the existing machines to prevent overwhelming the existing machines. Alternately, the newer machines must be configured to limit their resource utilization to the capacity of the existing machines, preventing the additional capacity of the newer machines from being utilized.

SUMMARY OF THE INVENTION

There is a need for an arrangement that enables services to be provided in a network by multiple computing nodes, where the behavior of all the computing nodes in a computing group are equivalent such that each of the computing nodes provide equivalent service levels. Such equivalent service levels provide a perception for a client that the same read/writable data can be accessed, in a manner that provides data replication, fault tolerance, and load balancing, from any one of the computing nodes in the computing group. The establishment of equivalent service levels for all computing nodes within the computing group enable larger nodes to provide more services and/or data based on joining more computing groups, whereas smaller computing nodes will supply fewer services and/or data based on joining a fewer number of computing groups.

There also is a need for an arrangement that enables computing nodes having substantially different capacity levels (i.e., at least in order of magnitude of 10 times) to participate in distributed computing operations in a distributed network, without overwhelming the capacity of any one computing node participating in the distributed computing operations.

There also is a need for an arrangement that enables a network to employ distributed computing in a manner that self-adapts to changes in service requirements, without loss of data or necessity of manual reconfiguration of network nodes.

There also is a need for an arrangement that enables each of the computing nodes in a distributed network to adaptively participate in as many distributed services as desirable, based on the capacity of the corresponding computing node, where larger computing nodes having substantially larger capacity can contribute to providing a greater amount of distributed services relative to smaller computing nodes that provide a smaller amount of distributed services based on the respective capacity.

These and other needs are attained by the present invention, where a network provides distributed computing services based on participation in respective resource groups by computing nodes, each resource group including a corresponding resource requirement for any computing node that joins the corresponding resource group for execution of the corresponding distributed computing service. Each computing node, in response to determining its corresponding available node capacity, is configured for selectively creating and joining at least one new resource group for execution of a corresponding distributed computing service having a corresponding resource requirement, and/or selectively joining at least one of the available resource groups, based on the corresponding available node capacity satisfying the corresponding resource requirement. Each computing node also is configured for selectively leaving any one of the joined resource groups based on determined conditions. Hence, distributed computing services are provided by multiple computing nodes, where each computing node may choose to participate in as many resource groups as needed based on the corresponding available node capacity.

One aspect of the present invention provides a method in a computing node. The method includes determining an available node capacity for the computing node relative to any resource groups having been joined by the computing node. Each resource group has a corresponding resource requirement for providing a corresponding distributed computing service within a network. The method also includes selectively creating and joining a first of the resource groups based at least on determining that the corresponding resource requirement is less than the available node capacity, and selectively joining, within the network, a second of the resource groups based on the corresponding resource requirement of the second resource group being less than the available node capacity. The method also includes executing the distributed computing services for the resource groups having been joined by the computing node, according to the respective resource requirements. The selective creation and joining of resource groups enables each computing node to decide whether it prefers to create a new resource group, for example due to attributes of the computing node, including creation of the service upon initialization of the network. Moreover, the selective joining of a second of the resource groups enables the computing node to join as many resource groups as desired, based on the available node capacity. Consequently, computing nodes of differing sizes can join as many or as few resource groups as desired, based on the relative available node capacity.

Another aspect of the present invention provides a method in a network. The method includes providing an identification of resource groups, each resource group having a corresponding resource requirement for providing a corresponding distributed computing service within the network. The method also includes, in each computing node of the network, determining a corresponding available node capacity relative to any of said resource groups having been joined by the computing node, selectively joining at least one of the resource groups based on the corresponding resource requirement being less than the available node capacity, and executing the distributed computing services for the resource groups having been joined by the computing node, according to the respective resource requirements. The method also includes identifying the computing nodes having joined the resource groups, and providing connectivity for a user node, requesting one of the distributed computing services, to one of the computing nodes having joined the corresponding resource group.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 2A and 2B are diagrams illustrating resource group attributes and node attributes that specify reserved resources and available node capacity, respectively.

BEST MODE FOR CARRYING OUT THE INVENTION

Figure 1:
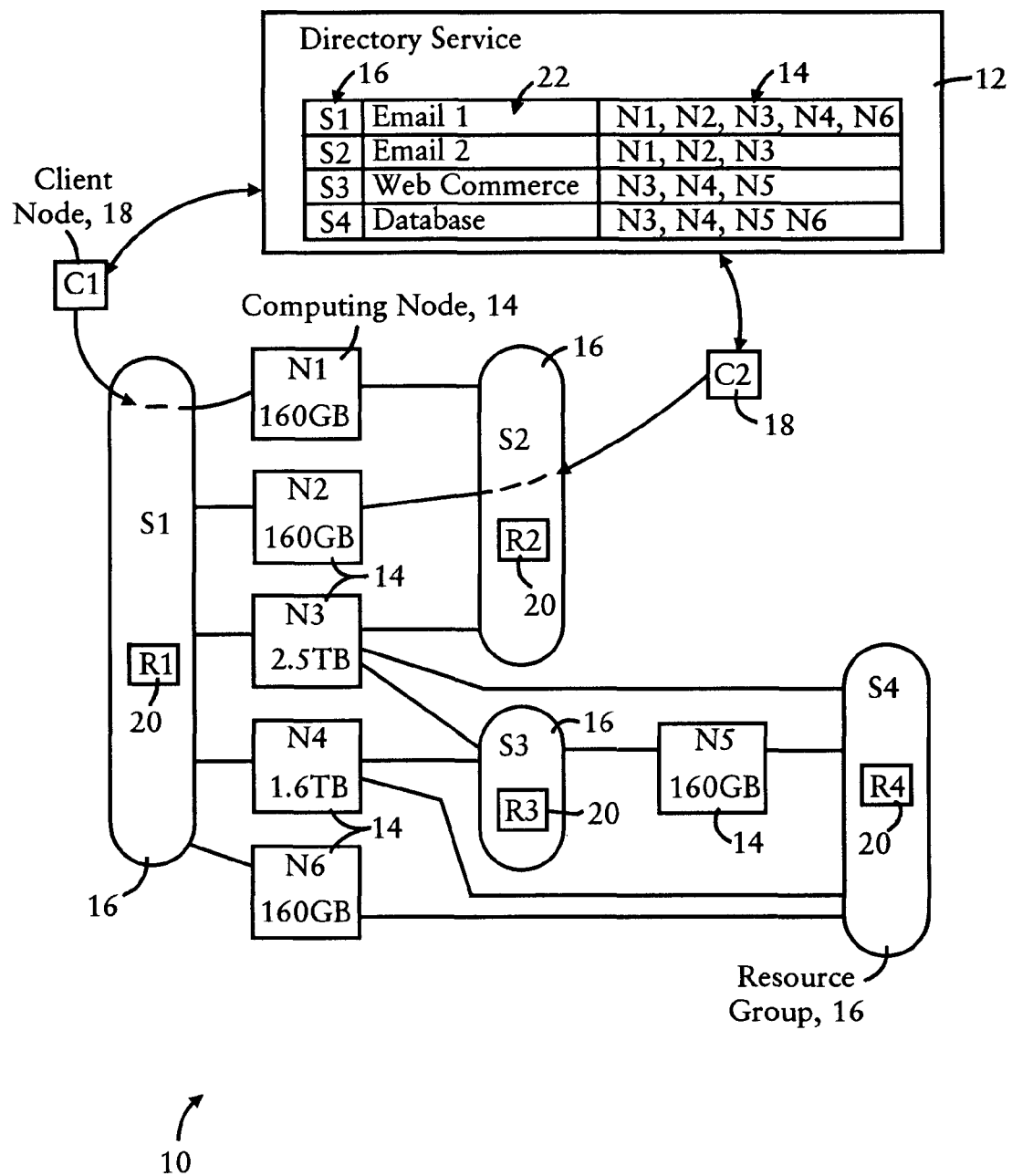
FIG. 1 is a diagram illustrating a distributed network having multiple computing nodes configured for providing distributed computing services based on having joined multiple resource groups, according to an embodiment of the present invention.

FIG. 1 is a diagram illustrating a network 10 having a directory service 12 and a plurality of computing nodes 14 configured for providing distributed computing services based on having joined resource groups 16, according to an embodiment of the present invention. In particular, each distributed computing service provided by the network 10 is implemented based on deployment of multiple resource groups 16 (e.g., S1, S2, S3, and S4), wherein each resource group 16 has its own corresponding set of resource group attributes 22. For example, the resource group "S1" 16 may be established for providing distributed services related to e-commerce, for example customer e-mail services, web hosting, online transaction management, order processing, and billing operations, etc., where each service is executed based on distributed processing by each of the connected computing nodes 14; the resource group "S2" 16 may be established for providing enterprise based services, for example employee e-mail applications, directory services including the directory service 12, or telephone directory services, accounting management, etc.; similar distributed services may be provided by the other resource groups "S3" and "S4". As described below with respect to FIG. 2A, the resource group attributes 22 for each resource group define both the resource requirements 20 necessary for any computing node to join the resource group, and the attributes 24 of the data replicated and/or executable resources that executed by each of the joined computing nodes 14 in order to provide the distributed services to client nodes 18.

The directory service 12, implemented for example as one of the distributed services provided by one of the resource groups 16, is configured for providing resolutions for identifying available resource groups 16 for client nodes 18 attempting to obtain a corresponding distributed service, and computing nodes 14 attempting to join a resource group to provide distributed processing. The query issued may specify different attributes about the service, for example service type (e.g., e-mail, e-commerce, accounting, database management), data type (e.g., e-mail data for user names starting with A-L and not L-Z), or some other class identification (e.g., corporate, engineering, marketing, legal, etc.). Additional details related to the directory service 12 can be obtained from commonly-assigned, application Ser. No. 11/000,041, filed Dec. 1, 2004, entitled "ARRANGEMENT IN A SERVER FOR PROVIDING DYNAMIC DOMAIN NAME SYSTEM SERVICES FOR EACH RECEIVED REQUEST", issued as U.S. Pat. No. 7,499,998, the disclosure of which is incorporated in its entirety herein by reference.

Each computing node 14 is configured for selectively joining an available resource group 16, or creating a new resource group 16, based on determining whether the available node capacity for the computing node 14 is sufficient for the resource requirement 20 specified for the corresponding resource group 16. Once a computing node 14 has joined a resource group 16, the joining of the computing node 14 with the resource group 16 is registered with the directory service 12, and client nodes 18 can be connected to a computing node 14 that provides the corresponding distributed service, based on the directory service 12 responding to a query identifying one of the distributed computing services by redirecting the client node 18 to one of the computing nodes 14 that joined the appropriate resource group 16.

Since a computing node 14 is configured for selectively joining a resource group 16 based on the computing node 14 deciding whether it has sufficient available node capacity for the corresponding resource requirement 20, smaller computing nodes 14 (e.g., N1, N2, N5, N6) that have only a limited amount of resources, for example only 160 gigabytes (GB) of storage capacity (or, for example, a limited CPU processing capacity), are able to provide a contribution to available resource groups 16 based on their relative available node capacities. For example, computing nodes N1 and N2 belong only to resource groups S1 and S2, computing node N5 belongs only to resource groups S3 and S4, and computing node N6 belongs only to resource groups S1 and S4.

Computing nodes 14 having substantially larger available node capacities, for example at least an order of magnitude greater (i.e., a difference of at least 10 times) (e.g., N4 having 1600GB (1.6TB) storage capacity, N3 having 2.5 Terabyte (TB) storage capacity) also can join the same resource groups 16 as the smaller computing nodes, since each computing node (e.g., N1, N2, N3, N4, N6) having joined a given resource group (e.g., S1) is required to provide only the amount of resources specified by the corresponding resource requirement 20 (R1). Hence, different sized computing nodes 14 can join the same resource group 16, even if the computing nodes 14 differ in size by orders of magnitude.

In addition, since each computing node 14 selectively joins a resource group 16 based on whether the corresponding resource requirement 20 is less than the available node capacity, larger nodes (e.g., N3) can join a greater number of resource groups 16, enabling the larger computing node 14 to provide virtualized services to a substantially larger number of resource groups. As illustrated in FIG. 1, the larger computing node "N4" is able to join the resource groups S1, S3, and S4, and the largest illustrated computing node "N3" is able to join all of the illustrated resource groups S1, S2, S3, and S4 due to its substantially large capacity. Consequently, the network 10 may be composed of smaller computing nodes N1, N2, N5, N6 14 (e.g., laptop computers) that may only have sufficient capacity to join one or two resource groups 16, whereas larger computing nodes N3, N4 14 (e.g., fixed data centers) may be able to join hundreds or even thousands of resource groups 16, as needed.

FIG. 2A is a diagram illustrating resource group attributes 22 for a given resource group 16, including the associated resource requirement 20 necessary for a computing node 14 to join the resource group 16, according to an embodiment of the present invention. The resource group attributes 22 for a given resource group 16 include the resource requirements 20 that need to be reserved by each computing node 14 that joins the resource group 16, and distributed computing service attributes 24 that describe in detail the distributed computing service provided by each of the computing nodes 14 having joined the resource group 16. For example, the resource group "S1" may have computing service attributes 24 that specify service attributes 26 related to the type of distributed service being provided (e.g., e-mail application, directory services applications such as directory service 12, e-commerce applications, data processing or database applications, financial transaction applications, etc.). The computing service attributes 24 also may specify data attributes 28 that specify the attributes of the data that is replicated among the computing nodes 14 belonging to the resource group 16. For example, the data attributes 28 may specify features such as data type (e.g., e-mail message, word processing document, spreadsheet, database object, etc.) source of the data (e.g., author, e-mail composer, financial transaction identifier, etc.) time and date of creation, security key identifiers, or any other class attribute that may be used to classify the data.

Hence, each resource group 16 can be defined based on the attributes 26 of the services being provided, as well as the attributes 28 of the data which is replicated among the computing nodes 14. Also apparent from the foregoing is that each of the computing nodes 14 that belong to a given resource group 16 can respond to a given service attribute 26 that specifies that all data is to be replicated among the computing nodes of the resource group 16, and that each computing node 14 of the resource group 16 has authority to modify the data or create new data, and a requirement to update the other computing nodes 14 of any modification or creation to ensure data is synchronized. An exemplary method of replicating data among the computing nodes 14 is disclosed in commonly-assigned, copending application Ser. No. 10/859,209, filed Jun. 3, 2004, entitled "ARRANGEMENT IN A NETWORK NODE FOR SECURE STORAGE AND RETRIEVAL OF ENCODED DATA DISTRIBUTED AMONG MULTIPLE NETWORK NODES", the disclosure of which is incorporated in its entirety herein by reference. In addition, only the computing nodes 14 that belong to the resource group 16 have authority to modify the associated data, such that non-members cannot modify the data of the resource group. Ownership of authority to modify data is described in commonly-assigned, copending application Ser. No. 10/859,208, filed Jun. 3, 2004, entitled "ARRANGEMENT IN A NETWORK FOR PASSING CONTROL OF DISTRIBUTED DATA BETWEEN NETWORK NODES FOR OPTIMIZED CLIENT ACCESS BASED ON LOCALITY", the disclosure of which is incorporated in its entirety herein by reference.

FIG. 2B is a diagram illustrating a resource table 30 maintained by each computing node 14 in order to track reserved (i.e., allocated) resources, and available node capacity, according to an embodiment of the present invention. In particular, each computing node 14 determines for itself the available node capacity 32, which may be measured for example in terms of storage capacity 34, device bandwidth 36, transaction capacity 38, CPU load 40, etc. The resource table 30 also includes reserve entries 34 that specify the amount of resources that are reserved for respective resource groups to which the computing node is a member (e.g., S1, S2), plus resources reserved for system use by the computing node 14, described below.

Hence, each computing node 14 is able to determine whether it wants to join any given resource group 16 based on comparing the resource group attributes 24 with internal computing node attributes (not shown) that specify preferences for the types of distributed services the computing node 14 should provide. For example, a computing node 14 may include internal computing node preferences (not shown) to indicate the computing node 14 should avoid database management services or financial transaction services, but should join any distributed services associated with a prescribed class of service, for example e-mail server applications, Web hosting applications, Voice over IP applications, etc. In addition, the computing node 14, upon determining that it wishes to join a given resource group, can compare the resource requirement 20 of that resource group 16 with the available node capacity 32 in order to determine whether the computing node 14 has sufficient available resources to join that resource group 16.

Figure 3:
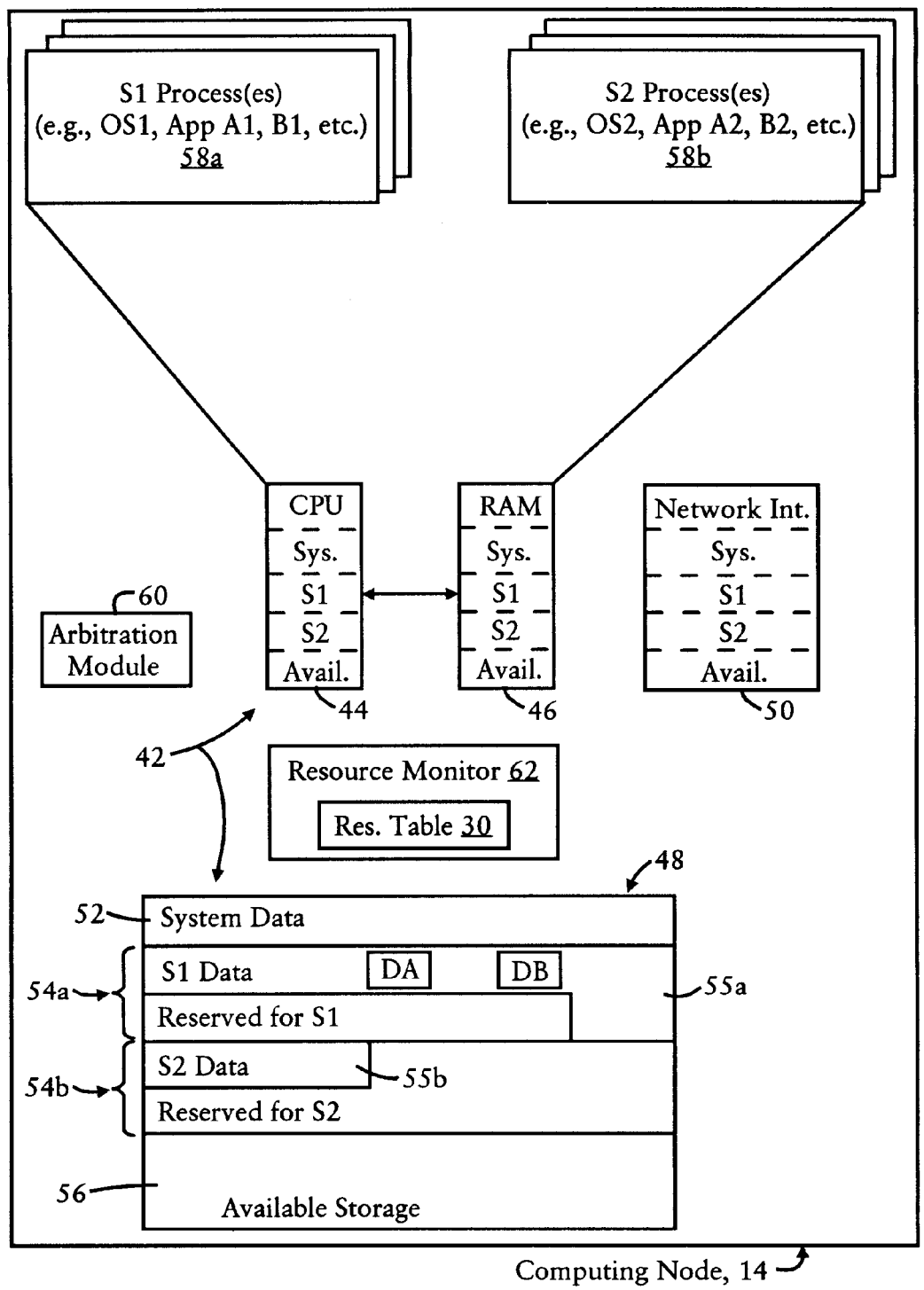
FIG. 3 is a diagram illustrating one of the computing nodes, according to an embodiment of the present invention.

FIG. 3 is a diagram illustrating in detail one of the computing nodes 14 of FIG. 1, according to an embodiment of the present invention. Each computing node 14 includes computing node resources 42 including a processor unit 44, processor memory 46, data storage 48, and a network interface 50. As illustrated in FIG. 3, the data storage 48 includes a reserved portion 52 for storage of system data, reserved portions 54a and 54b for storage of data associated with respective joined resource groups "S1" and "S2", and an available storage portion 56 that is free space that is available for use. As illustrated in FIG. 3, the execution of software by the processor 44 using processor memory 46 may result in instantiation and execution of executable processes 58a and 58b for the respective resource groups "S1" and "S2", where each of the processes 58a and 58b may include their own distinct operating systems, applications, etc.

As illustrated in FIG. 3, the CPU 44, the processor memory 46, and a network interface 50 each have portions of their respective resources allocated for system use, the joined resource groups "S1" and "S2" and available capacity that is available for use.

The computing node 14 also includes a resource monitor 62 configured for continually monitoring the resource utilization in each of the computing node resources 44, 46, 48, and 50, and updating the resource table 30 to indicate the amount of computing node resources that are consumed by each of the joined resource groups 16 relative to the reserved capacity as specified in the resource table 30. The resource monitor 62 also is configured for determining the available node capacity 32 based on comparing the total system capacity minus the reserved capacity 34 that has already been allocated. As described below, the resource monitor 62 also is configured for comparing the amount of consumed resources relative to reserved capacity for a given resource group, and predicting when the amount of consumed resources for a resource group may exceed the resource requirements of the resource group, necessitating a split in the resource group.

The computing node 14 also includes a resource group arbitration module 60 configured for reading the resource table 30 in order to identify the available node capacity 32 determined by the resource monitor 62. The resource group arbitration module 60 is configured for selectively creating a new resource group 16, as needed for example due to internal attributes including administrator settings, etc. The resource group arbitration module 60 also is configured for identifying available resource groups 16, for example by accessing the directory service 12, and selectively joining resource groups 16 based on the associated group attributes 24, and also based on whether the resource requirement 20 of the available resource group 16 is less than the available node capacity 32. Based on the available node capacity 32 being sufficient for the resource requirement 20, the arbitration module 60 can allocate reserve capacity 34 and join the resource group 16, if desired. If after joining the resource group 16 and allocating the corresponding reserve capacity 34 the arbitration module 60 identifies that available node capacity is still present, the arbitration module 60 can continue to selectively join additional resource groups 16 based on the available node capacity 32 being sufficient for the corresponding resource requirement 20.

Figure 5A:
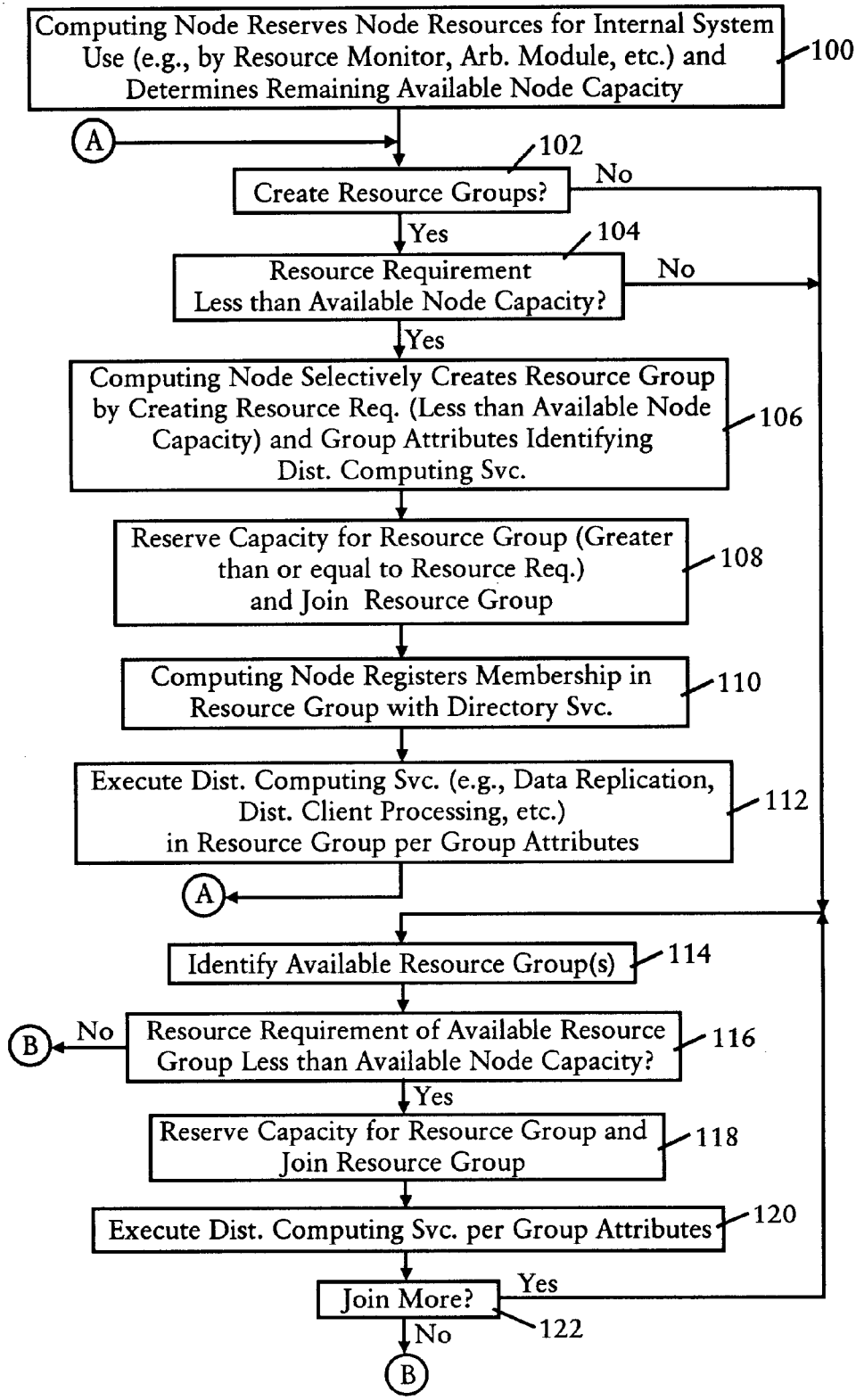
FIGS. 5A and 5B are diagrams summarizing the method of creating and joining resource groups for execution of distributed computing services by computing nodes, according to an embodiment of the present invention.
Figure 5B:
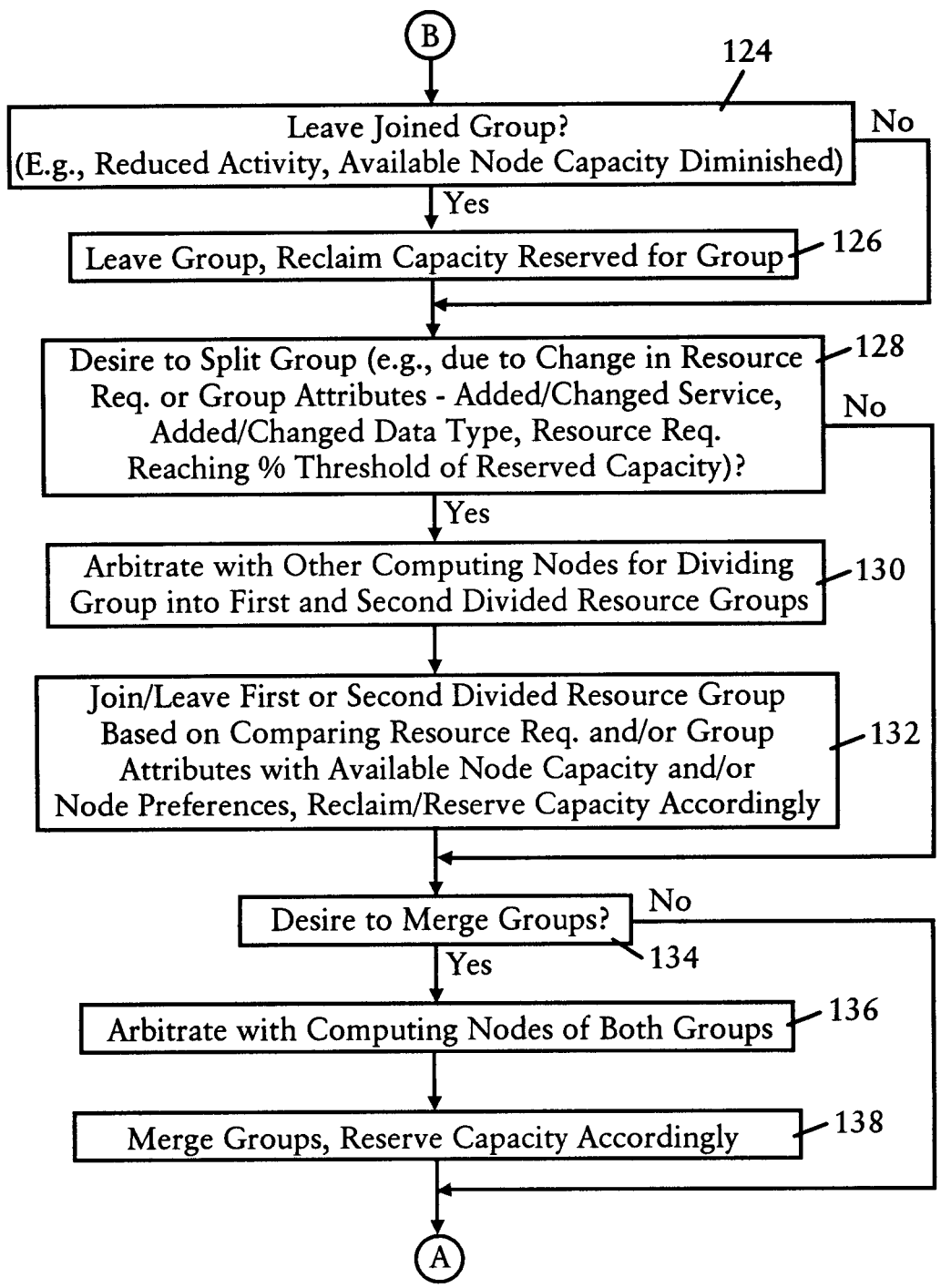

FIGS. 5A and 5B are diagrams summarizing the method of creating and joining resource groups 16 and a network 10 in order to provide distributed computing services within the network 10, according to an embodiment of the present invention. The steps described herein can be implemented in each network node as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 100 of FIG. 5A, where each computing node 14 reserves node resources 52 for internal system use, including for example for use by the resource monitor 62, and the arbitration module 60. Alternately, the resource monitor 62 and the arbitration module 60 may be implemented as discrete components that are distinct from the processor 44 and the memory 46. In addition, the resource monitor 62 determines the available node capacity and stores the parameters in its entry table 32.

The resource monitor 62 continually monitors all consumption of resources in order to determine if consumption of resources by an assigned consumer (e.g., a resource group 16) reaches a prescribed percentage threshold (e.g., 95%) relative to the amount of reserved capacity 34. For example, the resource monitor 62 may employ a first-order instantaneous resource consumption evaluation based on comparing the instantaneous resource consumption (e.g., stored S1 data 55a) relative to the reserved resource 54a required by the corresponding resource requirement 20. The resource monitor 62 also may employ a second-order instantaneous resource consumption evaluation (e.g., running average, projected utilization) by predicting when the resource consumption (e.g., 55a) may exceed the reserved resource (e.g., 54a). Third-order instantaneous resource consumption evaluation may be employed by the resource monitor 62 to identify "hot spots" (also known as "jerk"), and fourth-order evaluation may be used to assess data stability, and locality. Any one of these factors may be used to determine whether to split or merge a resource group, described below.

The arbitration module 60 determines in step 102 whether any new resource groups 16 need to be created, for example based on internal attributes that may identify the absence of a prescribed distributed service in the network 10. For example, at network start up if the computing node 14 is the first computing node to enter the network 10, the computing node 14 will begin to generate resource groups 16 in order to begin providing distributed computing services in the network 10. In this example of network startup, one of the first resource groups 16 created may be used to provide the directory service 12.

If new resource groups are to be created, and if in step 104 the resource requirement 20 is less than the available node capacity 32, the arbitration module 60 selectively creates in step 106 a new resource group 16 by creating the resource requirements 20, the attributes 24, and reserving in step 108 the capacity 34 needed to join the resource group 16. If necessary, the arbitration module 60 registers in step 110 with the directory service 12 indicating that the computing node 14 (e.g., "N1") is a member of the resource group 16 (e.g., "S1"). The computing node 14 can begin executing distributed computing services in step 112, for example replication of data among other computing nodes 14 belonging to the same resource group 16, or serving a connected client node 18, based on instantiating the appropriate process 58a for the distributed computing service.

If in step 102 no new resource groups need to be created, the arbitration module 60 identifies in step 114 any available resource groups (e.g., "S2") 16, for example based on issuing a query to the directory service 12 that requests identification of either all available resource groups 16, or selected resource groups having selected service attributes 24 (e.g., e-mail application service) or selected data attributes 28. In response to receiving from the directory service 12 at least one resource requirement 24 for a corresponding resource group 16, the resource group arbitration module 60 determines in step 116 whether the resource requirement 20 for joining the available resource group 16 is less than the available node capacity 32. If the resource requirement 20 is not less than the available node capacity 32 (i.e., the resource requirement 20 exceeds the available node capacity 32), the resource group arbitration module 60 decides to not join the resource group, and continues with the steps of FIG. 5B, described below.

If in step 116 the resource group arbitration module 60 determines that the resource requirement 20 does not exceed the available node capacity 32, the resource group arbitration module 60 reserves capacity in step 118 from the available node capacity 32, creates an additional entry 34 for the reserved capacity, and joins the resource group 16.

The resource group arbitration module 60 finishes joining the resource group 16 by notifying the other computing nodes 14 already belonging the resource group 16 of its having joined the resource group 16. The other computing nodes already belonging to the resource group 16 can then replicate their data associated with the resource group 16 to the newly-joined computing node 16 for storage in the associated reserved data storage 54, enabling the computing resources 42 to execute in step 120 the distributed computing services, for example by instantiating the relevant software processes (e.g., 58a). If in step 122 the resource group arbitration module 60 decides that more resource groups 16 should be joined (e.g., based on the available node capacity 32 being substantially larger than any of the reserved capacity entries 34), steps 114 through 120 are repeated, else the resource group arbitration module continues with the steps as illustrated in FIG. 5B.

FIG. 5B illustrates steps executed by the resource group arbitration module 60 in determining whether to leave a joined group, split an existing group, or merge groups. As described above, the resource monitor 62 may employ varied metrics to determine whether the reserved capacity (e.g., 54a) for a resource group is about to be depleted due to the growth of consumed resources (e.g., 55a). Hence, each of the resource groups 16 are dynamic in that their characteristics (identified by the stored attributes 22) may change, in terms of resource requirements 20 due to additional loading on the distributed services (e.g., due to more user nodes 18 requesting service from the resource group 16) or an accumulation of stored data, or in terms of changes in the computing service attributes 24, for example changes in service attributes 26 indicating that a new service is to be provided that differs from existing services, or that a similar services to be provided using different resource types. Consequently, each of the resource group arbitration modules 60 are configured for adapting the resource groups 16 to changes in the computing service attributes 24, or the resource requirements 20, optimizing performance of the resource group 16 and enabling the capacity of the network 10 to increase based on creating new resource groups 16.

If in step 124 the resource group arbitration module 60 determines to leave a joined group 16, for example due to reduced activity in the resource group 16, or based on determining that the available node capacity has diminished below a prescribed threshold, the resource group arbitration module 60 leaves the resource group 16 in step 126 by notifying the other members of the resource group, and reclaiming the capacity 34 that had been reserved for the resource group 16, and returning the reclaimed capacity back to the available node capacity 32. Note that even though a computing node 14 implemented as a laptop could decide to leave a joined group in anticipation of being disconnected from the network 10, the disclosed embodiment does not necessarily require that the computing node 14 leaves the joined group 16 merely because it will be disconnected from the other computing nodes 14; rather, the computing node 14 still could continue to provide distributed services while disconnected from the other computing nodes 14 of the resource group, and simply resynchronize data and state information upon reconnection with the other computing nodes 14.

Figure 4:
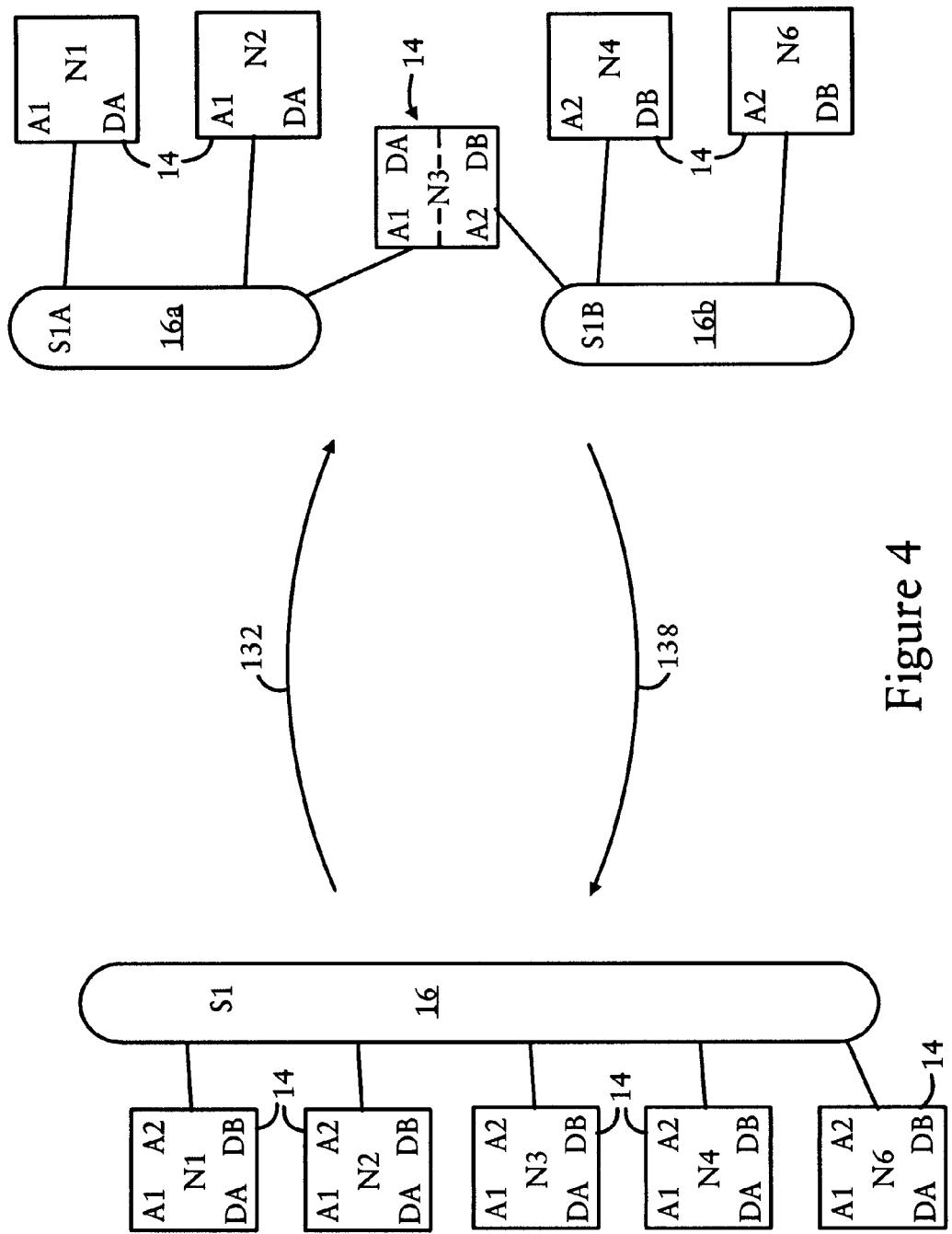
FIG. 4 is a diagram illustrating computing nodes of a resource group arbitrating for dividing the resource group into divided resource groups, and arbitrating for merging resource groups into a merged resource group, according to an embodiment of the present invention.

FIG. 4 is a diagram illustrating a resource group 16 ("S1") 16 that is split (i.e., divided) into divided resource groups 16a ("S1A") and 16b ("S1B"). For example, assume that each of the computing nodes 14 replicate among each other the same data classes, namely DA and DB, and share in providing distributed services based on each executing the executable application processes A1 and A2.

The resource group arbitration module 60 of any one of the joined nodes 14 can determine in step 128 of FIG. 5B whether it is desirable to split the group S1, for example due to determining that a change in the resource requirements 20 is needed (e.g., the resource monitor 62 has predicted that an accumulation of data will cause the consumed resource 55a to exceed the reserved capacity 34, the resource monitor has predicted an increase in processing requirements due to more client nodes 18, etc.), or due to a change in the computing service attributes 24. As described above, exemplary changes in the attributes 24 include an added or changed distributed computing service, an added or changed data attribute such as data type, etc. Assume in this example that the arbitration module 60 of computing node "N3" prefers to split the data classes and the application processes and two distinct resource groups 16a and 16b.

The resource group arbitration module 60 of that node (N3) arbitrates in step 130 with the arbitration modules 60 of the other computing nodes (N1, N2, N4, N6) 14 belonging to the resource group 16 for dividing the resource group S1 into divided resource groups 16a and 16b that will have their own respective resource group attributes 22, including computing service attributes 24 and resource requirements 20. Upon completion of the arbitration in step 130, each of the computing nodes in step 132 either leaves the old group "S1" 16 and joins the newly divided group "S1B" 16b, or stays in the remaining group 16; depending on the nature of the resource groups, each computing node may reclaim the capacity having been transferred to the second group "S1B" 16b, effectively joining the divided group "S1A" 16a based on the transformation of group "S1" into "S1A" upon closing of resources associated with the resources "A2" and "DB" of group "S1B"; alternately, the resource requirement for the newly divided group may equal the original resource requirement, effectively doubling the capacity of the system due to a creation of another resource group having the same requirement.

Hence, the computing nodes N1, N2, and N3 join the divided computing group "S1A" 16a, and the computing nodes N3, N4, and N6 join the divided computing group "S1B" 16b, where the divided computing group "S1A" 16a replicates data for the data class "DA" and provides distributed services associated with application process "A1", and divided computing group "S1B" 16b replicates data for the data class "DB" and provides distributed services associated with the application process "A2".

Hence, the splitting of the resource group "S1" 16 into the two divided resource groups "S1A" 16a and "S1B" 16b enables capacity in the network to be increased, since the respective resource requirements 20 of the divided resource groups "S1A" 16a and "S1B" 16b (e.g., 20GB storage each) are equal to the original resource requirements 15 of the original resource group 16, resulting in a doubling in system capacity. In addition, splitting may be effective for dividing distributed services that have mutually exclusive data operations, for example dividing an e-mail service based on logically dividing a population e-mail subscribers between the two resource groups 16a and 16b. However, the larger nodes (e.g., N3) still can participate in both resource groups 16a and 16b, resulting in a service virtualization of the node N3 into two distinct virtual computing nodes without any loss of computing resources or risk of data loss.

If at some time the resource group arbitration module 60 of a node (e.g., N4) determines in step 134 a desire to merge the existing resource group (e.g., "S1B") 16b with another resource group (e.g., "S1A") 16a, for example due to diminished resource requirements 20, or a convergence of resource group attributes 22, the resource group arbitration module 60 of computing node N4 arbitrates in step 136 with the arbitration modules 60 of the computing nodes 14 of both groups 16a (N1, N2, N3) and 16b (N3, N6) to decide whether to merge the groups 16a and 16b, for example based on comparing the associated resource group attributes 22. Assuming all the computing nodes that belong to the resource groups 16a and/or 16b decide to merge, the resource group arbitration modules 16 of the computing nodes 14 merge the two resource groups 16a and 16b in step 138 into a single merged resource group 16 (S1) based on replicating data among each other, and reserving capacity accordingly. The overall process in each computing node 14 repeats itself as described above with respect to FIG. 5A.

As apparent from the foregoing, there may be provisions to allow instantaneous consumption to exceed the resource capacity for a limited time, in order to accommodate instances such as when one computing node fails, the other computing nodes may be over-burdened temporarily. Further, the decision whether to split or merge is not limited to evaluating instantaneous consumption, as each element of the resource group attributes 22 may have specific semantic information that is not related to the instantaneous consumption (e.g., security considerations, day of week, etc). Any one of these factors may be relevant in determining whether to split or merge a resource group.

According to the disclosed embodiment, distributed services in a network are provided by computing nodes having substantially different node capacities, based on each computing node selectively joining a resource group having a resource requirement that is less than the available node capacity. Each computing node that joins a resource group, however, shares the same amount resources as specified by the resource requirement for the resource group, regardless of the overall capacity of the computing node. Hence, substantially larger computing nodes can join a larger number of resource groups, providing distributed service virtualization without concerns of loss of data if the larger computing node becomes unavailable. In addition, substantially larger computing nodes can be added to the network 10 without any adverse effect on existing computing nodes 14 already in the network. In addition, each computing node 14 retains its own control to decide whether it should create a new computing group, join an existing computing group, or leave a computing group; each computing node 14 also can arbitrate with other computing nodes of the resource group to determine whether the resource group should be split, or merged with another resource group, providing an adaptive and scalable distributed computing system that can automatically adapt to changes.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a computing node, comprising:
   determining by the computing node an available node capacity for the computing node relative to any resource groups having been joined by the computing node, each resource group having a corresponding resource requirement that is necessary for any computing node joining the resource group to allocate for providing a corresponding distributed computing service within a network;
   selectively joining by the computing node a first of the resource groups in the network based at least on the computing node determining that the corresponding resource requirement is less than the available node capacity;
   selectively joining by the computing node a second of the resource groups based on the computing node determining the corresponding resource requirement is less than the available node capacity; and
   executing by the computing node the distributed computing services for the resource groups having been joined by the computing node, each computing node retaining its own control to decide whether to join or leave any of the resource groups, enabling computing nodes having substantially different node capacities to provide the distributed computing service.

2. The method of claim 1, wherein the determining includes determining the available node capacity relative to at least any one of available data storage space, available network bandwidth, available transaction capacity, or available CPU resources.

3. The method of claim 2, wherein one of the distributed computing services includes replicating data, the executing step including replicating a data element to each of other computing nodes having joined the corresponding resource group, at least one of the other computing nodes having a corresponding available node capacity that is at least an order of magnitude different than the available node capacity of the computing node.

4. The method of claim 3, wherein the order of magnitude provides a difference of at least ten (10) times between the available node capacity of the computing node and the available node capacity of the second computing node.

5. The method of claim 1, further comprising:
   determining by the computing node whether the first and second resource groups, having been joined by the computing node, should be merged into a merged resource group;
   arbitrating by the computing node among other computing nodes having joined at least one of the first and second resource groups, for merging the first and second resource groups into the merged resource group; and merging the first and second resource groups into the merged resource group.

6. The method of claim 1, wherein the steps of selectively joining the first resource group, and selectively joining the second resource group, each include reserving a corresponding reserved capacity for the corresponding resource group from the available node capacity, the method further comprising:

detecting a need for a change in the resource requirement for a corresponding one of the resource groups having been joined by the computing node, based on any one of an added distributed computing service relative to the corresponding distributed computing service, an added data type attribute relative to an existing data attribute of the one resource group, or determining that the resource requirement is insufficient;

arbitrating, between other computing nodes having joined the one resource group, for dividing the one resource group into first and second divided resource groups having respective first and second divided resource requirements generated based on the change; and selectively joining at least one of the first and second divided resource groups based on the change and a determined attribute of the corresponding one divided resource group having been joined.

7. The method of claim 1, further comprising providing at least one of the distributed computing services to a user node having requested the one distributed computing service via the network.

8. A computing node comprising:

a resource monitor configured for determining an available node capacity for the computing node relative to any resource groups having been joined by the computing node, each resource group having a corresponding resource requirement that is necessary for any computing node joining the resource group to allocate for providing a corresponding distributed computing service within a network;

a resource group arbitration module configured for:

selectively joining a first of the resource groups in the network based at least on determining that the corresponding resource requirement is less than the available node capacity, and selectively joining a second of the resource groups based on determining the corresponding resource requirement is less than the available node capacity; and computing node resources configured for executing the distributed computing services for the resource groups having been joined by the computing node, according to the respective resource requirements, the resource monitor determining the available node capacity based on consumption of the computing node resources for the executed distributed computing services, each computing node retaining its own control to decide whether to join or leave any of the resource groups, enabling computing nodes having substantially different node capacities to provide the distributed computing service;

wherein the computing node includes a processor and a memory for executing steps of the computing node.

9. The computing node of claim 8, wherein the computing node resources includes data storage having available data storage space, a network interface having available network bandwidth, and the processor having available CPU resources and available transaction capacity, the resource monitor configured for determining the available node capacity relative to at least any one of the available data storage space, the available network bandwidth, the available transaction capacity, or the available CPU resources.

10. The computing node of claim 9, wherein one of the distributed computing services includes replicating data, the computing node resources configured for replicating a data element to each of other computing nodes having joined the corresponding resource group, at least one of the other computing nodes having a corresponding available node capacity that is at least an order of magnitude different than the available node capacity of the computing node.

11. The computing node of claim 10, wherein the order of magnitude provides a difference of at least ten (10) times between the available node capacity of the computing node and the available node capacity of the second computing node.

12. The computing node of claim 8, wherein the resource group arbitration module further is configured for:

determining whether the first and second resource groups, having been joined by the computing node, should be merged into a merged resource group;

arbitrating among other computing nodes having joined at least one of the first and second resource groups, for merging the first and second resource groups into the merged resource group; and merging the first and second resource groups into the merged resource group.

13. The computing node of claim 8, wherein the resource group arbitration module is configured for:

reserving a corresponding reserved capacity from the available node capacity for each joined resource group;

detecting a need for a change in the resource requirement for a corresponding one of the resource groups having been joined by the computing node, based on any one of an added distributed computing service relative to the corresponding distributed computing service, an added data type attribute relative to an existing data attribute of the one resource group, or determining that the resource requirement is insufficient;

arbitrating, between other computing nodes having joined the one resource group, for dividing the one resource group into first and second divided resource groups having respective first and second divided resource requirements generated based on the change; and selectively joining at least one of the first and second divided resource groups based on the change and a determined attribute of the corresponding one divided resource group having been joined.

14. The computing node of claim 8, wherein the computing node resources are configured for providing at least one of the distributed computing services to a user node having requested the one distributed computing service via the network.

15. A computing node comprising:

means for determining an available node capacity for the computing node relative to any resource groups having been joined by the computing node, each resource group having a corresponding resource requirement that is necessary for any computing node joining the resource group to allocate for providing a corresponding distributed computing service within a network;

means for selectively joining a first of the resource groups in the network based at least on determining that the corresponding resource requirement is less than the available node capacity, the means for selectively joining further configured for selectively joining a second of the resource groups based on determining the corresponding resource requirement is less than the available node capacity; and means for executing the distributed computing services for the resource groups having been joined by the computing node, according to the respective resource requirements, each computing node retaining its own control to decide whether to join or leave any of the resource groups, enabling computing nodes having substantially different node capacities to provide the distributed computing service.

16. The computing node of claim 15, wherein the means for determining is configured for determining the available node capacity, relative to resources utilized by the means for executing, based on at least any one of available data storage space, available network bandwidth, available transaction capacity, or available CPU resources.

17. The computing node of claim 16, wherein one of the distributed computing services includes replicating data, the means for executing configured for replicating a data element to each of other computing nodes having joined the corresponding resource group, at least one of the other computing nodes having a corresponding available node capacity that is at least an order of magnitude different than the available node capacity of the computing node.

18. The computing node of claim 15, wherein the means for joining further is configured for:
  determining whether the first and second resource groups, having been joined by the computing node, should be merged into a merged resource group;
  arbitrating among other computing nodes having joined at least one of the first and second resource groups, for merging the first and second resource groups into the merged resource group; and
  merging the first and second resource groups into the merged resource group.

19. The computing node of claim 15, wherein the means for selectively joining is configured for reserving from the available node capacity a corresponding reserved capacity for each corresponding resource group having been joined, the means for selectively joining further configured for:
  detecting a need for a change in the resource requirement for a corresponding one of the resource groups having been joined by the computing node, based on any one of an added distributed computing service relative to the corresponding distributed computing service, an added data type attribute relative to an existing data attribute of the one resource group, or determining that the resource requirement is insufficient;
  arbitrating, between other computing nodes having joined the one resource group, for dividing the one resource group into first and second divided resource groups having respective first and second divided resource requirements generated based on the change; and
  selectively joining at least one of the first and second divided resource groups based on the change and a determined attribute of the corresponding one divided resource group having been joined.

20. The computing node of claim 15, wherein the means for executing is configured for providing one of the distributed computing services to a user node having requested the one distributed computing service via the network.

* * * * *